United States Patent Office 3,127,368
Patented Mar. 31, 1964

3,127,368
PROCESS FOR THE PRODUCTION OF HOMOGENEOUS MIXTURES OF ETHYLENE POLYMERS AND CARBON BLACK
John E. Thomson, Lake Jackson, Tex., assignor to The Dow Chemical Company, Midland, Mich., a corporation of Delaware
No Drawing. Filed Feb. 29, 1960, Ser. No. 11,426
3 Claims. (Cl. 260—41)

This invention relates to the preparation of polymers of ethylene. More particularly it pertains to a new method for making a homogeneous mixture of ethylene polymers and carbon black.

It is known that ethylene gas alone or admixed with other polymerizable materials can be polymerized by subjecting it to superatmospheric pressure in excess of about 500 atmospheres and to temperatures above about 100° C. Various materials can be used to catalyze the polymerization reaction such as small amounts of oxygen or peroxide compounds. The product of this reaction is solid polymers of ethylene.

It has been found that polymers of ethylene degrade on ageing. The degradation is attributed at least in part to oxidation. Carbon black acts as a stabilizer and antioxidant for ethylene polymers when uniformly distributed therethrough and may be mixed with the polymer to reduce or substantially stop degradation thereof.

A commonly used method for obtaining compositions containing polymers of ethylene and carbon black uniformly distributed therethrough comprises mechanically mixing carbon black with stock polymer in a mixer to form a concentrate. The concentrate is forced through a screw extruder and cut to pellet form. A measured amount of the pellet concentrate is then mixed with an additional quantity of uncolored stock polymer to produce a polymer-carbon black blend of the desired composition. This composition is then passed through an extruder to improve the uniformity of the mixture. In each of these mixings and extrudings the polymer is subjected to considerable shearing and to elevated temperatures required to soften the polymer and mix in the black. In addition to the two mixings and two extrudings referred to above the composition is frequently subjected to another extrusion to further homogenize the mixture in order to obtain that degree of uniformity required by present commercial standards.

These heatings, mixings, and extrusions, in addition to being costly in manpower, time and equipment, have the serious detrimental effect of degrading the polymer. It is generally believed that shearing polymeric material reduces its molecular weight and this is confirmed by viscosity tests which show that the viscosity of a polymer is lowered by extrusion. In addition, a certain amount of degradation of the polymer takes place between the time it is made and the time the carbon black is mixed therewith.

It is among the objects of this invention to provide a new method for obtaining compositions comprising polymers of ethylene and carbon black.

A further object of this invention is to provide such a method in which the polymer in the composition is of the same grade as polymer freshly produced by a polymerization process.

A more particular object of this invention is to provide such a method in which the polymer is not degraded by heating, shearing, or ageing.

Another object of the present invention is to provide such a method in which the carbon black is admixed with the ethylene polymer before any degradation due to ageing or oxidation can take place.

Still another object of this invention is to provide a method for producing ethylene polymers having carbon black uniformly distributed therethrough in an economical manner and without the use of special mixers and extruders.

Further objects and advantages of the invention will be apparent in the following description.

It has now been discovered that homogeneous mixtures of polymers of ethylene and carbon black can be made by introducing carbon black in dry form or in a liquid carrier into a system in which ethylene is being polymerized at high pressures and temperatures. In a typical continuous high pressure-high temperature system for the polymerization of ethylene purified ethylene gas alone or admixed with other polymerizable materials is fed to a compressor. On leaving the compressor the material is under a pressure in excess of about 500 atmospheres and at a temperature in excess of 100° C. Catalysts, initiators, copolymerizable materials, telomerizing agents and other additives may be injected under pressure into the ethylene stream in the line leading from the compressor to a convertor. The convertor may be a thick-walled, heated steel cylinder or coiled pipe. The polymerization reaction takes place in the convertor and the effluent from the convertor is a mixture of molten polymer, unreacted monomer, catalyst, and other unpolymerized material if added earlier. This mixture passes through a pressure let down valve and is passed to a separator. Volatiles are piped from the separator to a recovery system and molten polymer which contains substances that have been added to the ethylene stream and not volatilized in the separator is passed through another pressure let down valve to an extrusion hopper. The hopper is vented for the further removal of volatiles and the molten polymer is extruded through an orifice into a cooling medium which may be water or atmospheric air and is solidified.

In accordance with the invention, carbon black is fed at a controlled rate into the system at one or more points between the compressor outlet and the extrusion orifice. For example, the carbon black may be introduced in the line between the compressor and the convertor, into the convertor itself, into the line carrying effluent from the convertor on either side of the pressure let down valve, into the molten polymer stream as it leaves the separator and into the extrusion hopper. Preferably the carbon black is introduced into the line leading from the compressor to the convertor or into the convertor itself in order that the carbon black be present at the moment the polymer is formed. In this way, the carbon black serves to stabilize the ethylene polymer from the earliest possible moment.

It will be understood that there may be more than one compressor and that such compressors may be in series or in parallel and their output joined through a T connection or the like. Also there may be more than one reactor, pressure control valve, separator, etc., and these like members may be arranged in series or in parallel.

The carbon black may be introduced in dry form from a pressurized vessel through a star valve or other suitable device. Alternatively, the carbon black may be suspended or dispersed in a liquid carrier which is not injurious to the process and the suspension or dispersion metered into the system by a pump or a valve at suitable places discussed above. Representative examples of suitable liquid carriers are molten plastic, plasticizers, low molecular weight hydrocarbons such as benzene, toluene, hexane, and chlorobenzene. Some liquids such as toluene and hexane telomerize with ethylene polymers and may be used when a telomerized polymer is desired. Benzene does not telomerize with ethylene polymers and is preferred. It has been found, however, that the benzene tends to solidify under the high pressures that it must be subjected to in order to introduce it into the polymerization system. This solidification takes place in the pump used to pressurize the benzene and in the feed line between the pressurizing pump and the polymerization system. When benzene is used as a carrier liquid for the carbon black and it is fed into the system at a point where, in order to feed it into the system, it must be subjected to such high pressures as to cause solidification of the benzene, it has been discovered that this difficulty may be obviated by admixing 10 to 20 percent by weight of hexane with the benzene to lower its freezing point. Another way in which this troublesome freezing or solidification of the carrier liquid may be overcome is to heat the carrier liquid in its storage vessel or the pressurizing pump and the feed line from the pump to the polymerization system. Once the carrier liquid is at a temperature sufficiently high to prevent its solidification at the pressures necessary to introduce it into the polymerization system, apparatus through which it subsequently passes may be either heated or insulated to prevent the temperature of the carrier liquid from falling to a temperature at which it can solidify. It has been found, for example, that when benzene is used as the carrier liquid and it is subjected to a pressure of 16,000 pounds per square inch, its solidification is prevented by heating it to a temperature of 60° C. Lower temperatures can be used to prevent solidification when a small portion of hexane is added to the benzene carrier liquid.

When a low viscosity liquid carrier for the carbon black is used, it is preferred to use a surface active agent to maintain the black suspended in the liquid. Especially suitable are non-ionic surface active agents. Both the ester type and the ether type non-ionic surface active agent can be used. Ethylene oxide derivatives of fatty acids are ester-type non-ionic surface active agents and representative of this type is the adduct of 10 moles of ethylene oxide and 1 mole of stearic acid. Representative of ether-type surface active substances useable in this invention is the non-ionic adduct of ethylene oxide and p-(1,1,3,3-tetramethylbutyl)phenol. It is found that at least about 2 percent by weight of the carbon black of dispersing agent is necessary to keep the carbon black suspended when using a benzene-hexane mixture as the carrier. It is also found that, when a slurry is fed into the system at a rate such as to produce an ethylene polymer containing about 2.5 percent carbon black, not more than 12 percent of surface active agent based on the weight of the carbon black in the slurry should be employed as amounts in excess of 12 percent produce "soupy" low melt index polymers unsuitable for many fabrication purposes. Accordingly, it is preferred to use in the carrier between 4 percent and 8 percent surface active agent based on the weight of the carbon black.

Ordinary carbon blacks including channel blacks and furnace blacks having particle sizes between about 50 and 350 Angstrom units are suitable for use in this invention. It is preferred to use blacks having particle sizes of from about 138 to 180 A. since blacks within this range have a reinforcing effect on the product and impart a pronounced blackness thereto. In making up a slurry of carbon black in a low viscosity liquid for feeding into the polymerization system the concentration of carbon black in the slurry may be any value up to about 10 percent by weight, preferably in the upper end of the range as 5 percent to 10 percent so as not to introduce more carrier into the polymer product than is necessary in order to produce a product having a particular percentage of carbon black. It is found that some slurries containing amounts of carbon black greater than 10 percent by weight are difficult to pump.

It is found that the pressurized ethylene and the molten polymer in various parts of the system are in a turbulent condition and that, therefore, it is unnecessary to do anything further than feed the carbon black into the system in order to obtain a carbon black-ethylene polymer mixture. However, if desired, an agitator may be used to facilitate mixing of the carbon black with the contents of the polymerization system.

The method of the present invention can be carried out in a batch polymerization system by injecting carbon black into the pressurized ethylene feed to the reactor, into the reactor itself, or into the efflux of the reactor before the polymer is solidified.

The following examples illustrate the invention, but are not to be constructed as limiting its scope. Parts and percentages are parts by weight and weight percentages unless otherwise specified.

*Example I*

To 250 parts of a slurry containing 75 percent benzene, 15 percent hexane, and 10 percent carbon black, the average diameter of the particles of the carbon black being 180 A., is added 1.25 parts of a surface active agent to stabilize the suspension of the carbon black in the slurry. The surface active agent is the reaction product of 10 moles of ethylene oxide with 1 mole of stearic acid.

The stabilized slurry is metered directly to a reactor in which polymerization of ethylene is occurring at a pressure of 16,000 pounds per square inch and at a temperature of 200° C. The effluent from the reactor is led through a pressure let down valve to a vessel in which volatile constituents such as unpolymerized ethylene, benzene, and hexane are separated from the polymer. During the time that the slurry is fed to the reactor, 9750 parts of ethylene are introduced. One thousand parts of black polyethylene containing approximately 2.5 percent by weight of carbon black uniformly distributed throughout the mass are obtained.

*Example II*

The stabilized slurry described in Example I is metered directly into the effluent from the reactor of a high pressure polymerization process, as described in Example I, as the polymer is leaving the reactor. A polymer of ethylene having 2.5 percent by weight of carbon black uniformly distributed therethrough is obtained.

Ethylene polymer compositions containing various amounts of carbon black, for example, 1 percent to 30 percent or more can be made in accordance with the process of this invention by regulating the rate of feed of the carbon black into the system. The compositions produced by this invention can be used as is or admixed with other materials such as plasticizers and fillers to make sheets, films, rods, tubes, wire coverings, and other articles by processes such as rolling, molding, extruding, coating, laminating, and other conventional techniques.

What is claimed is:

1. In a process for producing ethylene polymers by feeding a stream of ethylene under pressure to a polymerization vessel and polymerizing the ethylene at pressure above about 500 atmospheres and temperature above about 100° C., the improvement which comprises introducing into said vessel a dispersion of carbon black in benzene containing between 2 percent and 12 percent based on the weight of carbon black of a non-ionic surface active agent, withdrawing the resulting mixture from the vessel, separating unreacted ethylene and benzene from the polymer produced, and solidifying the polymer containing carbon black uniformly dispersed therethrough.

2. The improvement according to claim 1 wherein the non-ionic surface active agent in the benzene dispersion of the carbon black is between about 4 percent and about 6 percent based on the weight of the carbon black.

3. The improvement according to claim 1 wherein the carbon black dispersion contains about 75 percent benzene, about 15 percent hexane, about 10 percent carbon black and, based on the weight of the carbon black, about 5 percent of a non-ionic surface active agent.

References Cited in the file of this patent

UNITED STATES PATENTS

| | | |
|---|---|---|
| 2,188,465 | Perrin et al. | Jan. 30, 1940 |
| 2,816,883 | Larchar et al. | Dec. 17, 1957 |
| 2,834,768 | Friedlander | May 13, 1958 |
| 2,876,133 | Iler et al. | Mar. 3, 1959 |
| 2,955,096 | White | Oct. 4, 1960 |
| 3,008,949 | Langer et al. | Nov. 14, 1961 |

FOREIGN PATENTS

| | | |
|---|---|---|
| 771,955 | Great Britain | Apr. 10, 1957 |
| 1,164,934 | France | May 19, 1958 |